US012315919B2

(12) United States Patent
Do et al.

(10) Patent No.: US 12,315,919 B2
(45) Date of Patent: May 27, 2025

(54) CATHODE ACTIVE MATERIAL FOR LITHIUM SECONDARY BATTERY AND LITHIUM SECONDARY BATTERY INCLUDING THE SAME

(71) Applicants: SK INNOVATION CO., LTD., Seoul (KR); SK ON CO., LTD., Seoul (KR)

(72) Inventors: Ji Yae Do, Daejeon (KR); Min Suk Kang, Daejeon (KR); Min Cheol Beak, Daejeon (KR); Kwang Ho Lee, Daejeon (KR); Jae Young Choi, Daejeon (KR)

(73) Assignees: SK INNOVATION CO., LTD., Seoul (KR); SK ON CO., LTD., Seoul (KR)

( * ) Notice: Subject to any disclaimer, the term of this patent is extended or adjusted under 35 U.S.C. 154(b) by 90 days.

(21) Appl. No.: 18/343,747

(22) Filed: Jun. 29, 2023

(65) Prior Publication Data

US 2024/0186489 A1    Jun. 6, 2024

(30) Foreign Application Priority Data

Dec. 5, 2022    (KR) .................. 10-2022-0167877

(51) Int. Cl.
*H01M 4/36* (2006.01)
*H01M 4/58* (2010.01)
(Continued)

(52) U.S. Cl.
CPC ......... *H01M 4/366* (2013.01); *H01M 4/5825* (2013.01); *H01M 4/625* (2013.01); *C01P 2002/52* (2013.01); *C01P 2002/85* (2013.01); *C01P 2004/86* (2013.01); *C01P 2006/40* (2013.01); *H01M 2004/021* (2013.01); *H01M 2004/028* (2013.01); *H01M 4/0471* (2013.01)

(58) Field of Classification Search
None
See application file for complete search history.

(56) References Cited

U.S. PATENT DOCUMENTS

2013/0224595 A1    8/2013    Nuspl et al.
2017/0012282 A1    1/2017    Kondo et al.

FOREIGN PATENT DOCUMENTS

JP    2018-056035 A    4/2018
JP    2020-053332 A    4/2020
(Continued)

OTHER PUBLICATIONS

Office Action for the Korean Patent Application No. 10-2022-0167877 issued by the Korean Intellectual Property Office on Dec. 20, 2023.
(Continued)

*Primary Examiner* — Laura Weiner
(74) *Attorney, Agent, or Firm* — IP & T GROUP LLP

(57) ABSTRACT

A cathode active material for a lithium secondary battery according to an embodiment of the present disclosures a plurality of composite particles, each of which comprises a lithium metal phosphate particle, and a carbon coating formed on at least a portion of a surface of the lithium metal phosphate particle. A standard deviation of thickness values of the carbon coating measured by an X-ray photoelectron spectroscopy (XPS) for five different composite particles of the plurality of composite particles is 15 nm or less.

8 Claims, 2 Drawing Sheets

(51) Int. Cl.
  *H01M 4/62*  (2006.01)
  *H01M 4/02*  (2006.01)
  *H01M 4/04*  (2006.01)

(56) References Cited

FOREIGN PATENT DOCUMENTS

| | | |
|---|---|---|
| JP | 6741390 B2 | 8/2020 |
| KR | 10-0834054 B1 | 6/2008 |
| KR | 10-2011-0054619 A | 5/2011 |
| KR | 10-2012-0117234 A | 10/2012 |
| KR | 20130100293 A | 9/2013 |
| KR | 10-2015-0056532 A | 5/2015 |
| KR | 10-2015-0093542 A | 8/2015 |
| KR | 10-2017-0093085 A | 8/2017 |
| KR | 10-2018-0108381 A | 10/2018 |
| KR | 20200039715 A | 4/2020 |
| KR | 20210003239 A | 1/2021 |
| KR | 10-2022-0062974 A | 5/2022 |
| WO | WO 2009/144600 * | 12/2009 |
| WO | 2022237642 A1 | 11/2022 |

OTHER PUBLICATIONS

Extended European Search Report for the European Patent Application No. 23191342.7 issued by the European Patent Office on Feb. 7, 2024.

\* cited by examiner

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2022-0167877 filed on Dec. 5, 2022 in the Korean Intellectual Property Office (KIPO), the entire disclosure of which is incorporated by reference herein.

BACKGROUND

1. Field

The present disclosures relate to a cathode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

Examples of the secondary battery includes, e.g., a lithium secondary battery, a nickel-cadmium battery, a nickel-hydrogen battery, etc. The lithium secondary battery is widely developed and applied due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium metal phosphate can be used as a cathode active material for the lithium secondary battery.

As an application range of the lithium secondary batteries is being expanded, higher capacity/energy density and enhanced life-span are required. The lithium metal phosphate may have a low ionic conductivity to degrade a power property of the lithium secondary battery.

SUMMARY

According to an aspect of the present disclosures, there is provided a cathode active material for a lithium secondary battery having improved power property and low-temperature performance.

According to an aspect of the present disclosures, there is provided a lithium secondary battery including a cathode active material for a lithium secondary battery with improved power property and low-temperature performance.

A cathode active material for a lithium secondary battery includes a plurality of composite particles, each of which includes a lithium metal phosphate particle, and a carbon coating formed on at least a portion of a surface of the lithium metal phosphate particle. A standard deviation of thickness values of the carbon coating measured by an X-ray photoelectron spectroscopy (XPS) for five different composite particles of the plurality of composite particles is 15 nm or less.

In some embodiments, the thickness value of the carbon coating may be an etching depth at a point where a carbon concentration and a concentration of a metal element except for lithium contained in the lithium metal phosphate particle which are measured by etching a surface of the composite particle using an argon ion gun of the XPS are equal.

In some embodiments, an average of the thickness values of the carbon coating may be in a range from 5 nm to 15 nm.

In some embodiments, an average of the thickness values of the carbon coating may be in a range from 6.5 nm to 13 nm.

In some embodiments, the standard deviation of the thickness values of the carbon coating may be 9 nm or less.

In some embodiments, a content of the carbon coating may be in a range from 0.8 wt % to 1.4 wt % based on a total weight of the composite particle.

In some embodiments, the lithium metal phosphate particle may have an olivine structure and may be represented by Chemical Formula 1

$$Li_aM_xP_yO_{4+z}$$ [Chemical Formula 1]

In Chemical Formula 1, $0.9 \leq a \leq 1.2$, $0.99 \leq x \leq 1.01$, $0.9 \leq y \leq 1.2$, $-0.1 \leq z \leq 0.1$, and M includes at least one selected from the group consisting of Fe, Co, Ni and Mn.

In some embodiments, the lithium metal phosphate particle may contain a doping element or a coating element. The doping element or the coating element may include at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr.

A lithium secondary battery includes a cathode comprising the cathode active material for a lithium secondary battery according to the above-described embodiments, and an anode facing the positive electrode.

In a method of preparing a cathode active material for a lithium secondary battery, a lithium source, a metal phosphate, a carbon source and a dispersing agent are mixed to form a mixed solution. The mixed solution was dried to form a mixture. The mixture was calcined to form a cathode active material for a lithium secondary battery that includes a plurality of composite particles, each of which includes a lithium metal phosphate particle and a carbon coating formed on at least a portion of a surface of the lithium metal phosphate particle. A standard deviation of thickness values of the carbon coating measured by an X-ray photoelectron spectroscopy (XPS) for five different composite particles of the plurality of composite particles is 15 nm or less.

In some embodiments, the carbon source may include at least one selected from the group consisting of glucose, sucrose, lactose, maltose, a phenol-formaldehyde resin and a phenolic epoxy resin.

In some embodiments, the dispersing agent may include at least one selected from the group consisting of sodium hexametaphosphate, sodium tripolyphosphate and pyrophosphate.

In some embodiments, the calcining may be performed at a temperature from 500° C. to 900° C.

A cathode active material for a lithium secondary battery according to embodiments of the present disclosure includes a plurality of a composite particle that includes a lithium metal phosphate particle and a carbon coating formed on at least a portion of a surface of the lithium metal phosphate particle. An electrical conductivity of the cathode active material may be improved by the carbon coating, and thus power properties of the lithium secondary battery may be improved.

A standard deviation of thickness values of carbon coatings measured through an X-ray photoelectron spectroscopy (XPS) for five different composite particles among the plurality of the composite particle is 15 nm or less. Within this range, the carbon coatings may be uniformly formed on the surfaces of different composite particles. Accordingly, the electrical conductivity of the cathode active material may be improved, and power properties and low-temperature performance may be enhanced.

DETAILED DESCRIPTION OF THE EMBODIMENTS

Figure 1:
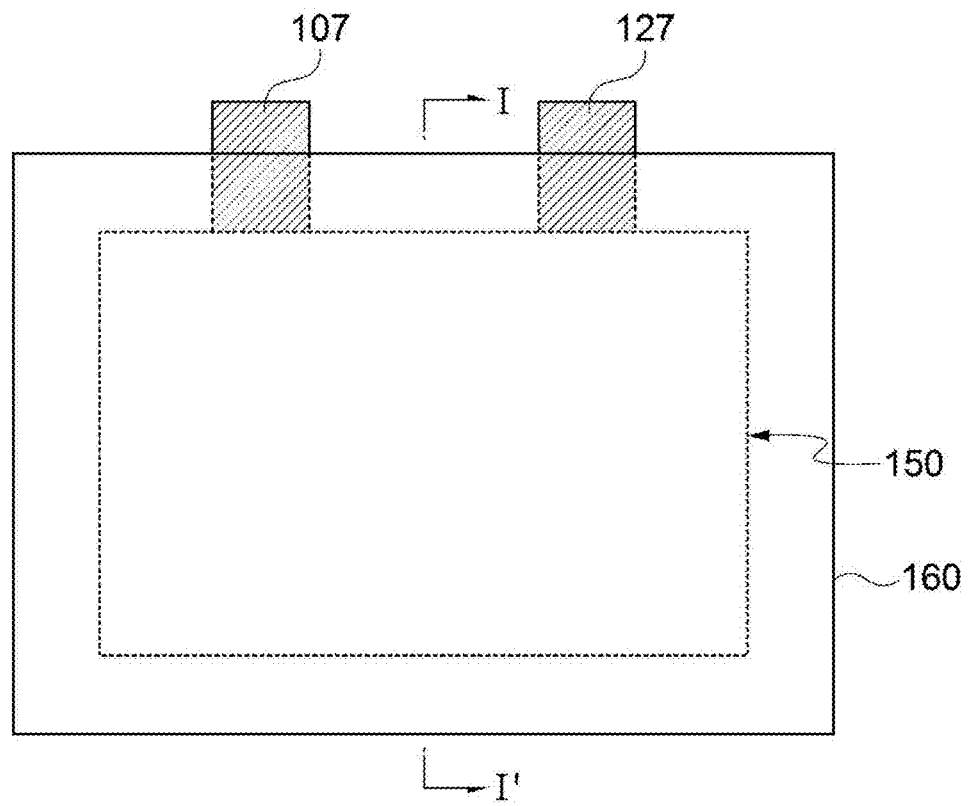
FIGS. 1 and 2 are a schematic plan view and a schematic cross-sectional view, respectively, illustrating a lithium secondary battery in accordance with example embodiments.

According to embodiments of the present disclosures, a cathode active material including lithium metal phosphate particles and a lithium secondary battery including the same are provided.

Hereinafter, embodiments of the present disclosures will be described in detail with reference to example embodiments and the accompanying drawings. However, those skilled in the art will appreciate that such embodiments and drawings are provided to further understand the spirit of the present disclosures and do not limit subject matters to be protected as disclosed in the detailed description and appended claims.

A cathode active material for a lithium secondary battery (hereinafter, abbreviated as a cathode active material') includes lithium metal phosphate particles.

In example embodiments, the lithium metal phosphate particle may have an olivine structure and may include a crystal structure represented by Chemical Formula 1 below.

$$Li_aM_xP_yO_{4+z}$$ [Chemical Formula 1]

In Chemical Formula 1, $0.9 \leq a \leq 1.2$, $0.99 \leq x \leq 1.01$, $0.9 \leq y \leq 1.2$, $-0.1 \leq z \leq 0.1$, and M may include at least one selected from the group consisting of Fe, Co, Ni and Mn.

The chemical structure represented by Chemical Formula 1 indicates a bonding relationship included in the crystal structure of the cathode active material and does not exclude other additional elements. For example, M includes Fe, Co, Ni and/or Mn, and Fe, Co, Ni, and/or Mn may serve as a main active element of the cathode active material. Chemical Formula 1 is provided to express the bonding relationship of the main active elements and is to be understood as a formula encompassing the introduction and substitution of additional elements.

In one embodiment, in addition to the main active element, an auxiliary element for enhancing chemical stability of the cathode active material or the crystal structure may be further included. The auxiliary element may be incorporated into the crystal structure to form a bond, and this case is also included within the chemical structure represented by Chemical Formula 1.

For example, the auxiliary element may include at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr. The auxiliary element such as Al may act as an auxiliary active element that contributes to capacity/power activities of the cathode active material together with Fe, Co, Ni or Mn.

For example, the cathode active material or the lithium metal phosphate particle may have a crystal structure represented by Chemical Formula 1-1 below.

$$Li_aM1_xM2_yP_zO_{4+b}$$ [Chemical Formula 1-1]

In Chemical Formula 1-1, $0.98 \leq a \leq 1.56$, $0.99 \leq x \leq 1.01$, $0 \leq y \leq 0.05$, $0.86 \leq z \leq 1.2$, $-0.1 \leq b \leq 0.1$. In Chemical Formula 1-1, M1 may include at least one selected from the group consisting of Fe, Co, Ni, and Mn. In Chemical Formula 1-1, M2 may include at least one selected from the group consisting of Na, Mg, Ca, Y, Ti, Hf, V, Nb, Ta, Cr, Mo, W, Fe, Cu, Ag, Zn, B, Al, Ga, C, Si, It Sn, Sr, Ba, Ra, P and Zr.

The cathode active material or the lithium metal phosphate particle may further include a coating element or a doping element. For example, the element substantially the same as or similar to the above-mentioned auxiliary element may be used as the coating element or the doping element. For example, one of the above elements or a combination of two or more therefrom may be used as the coating element or the doping element.

For example, M2 in Formula Chemical 1-1 may serve as the coating element or the doping element.

The coating element or the doping element may be present on a surface of the lithium metal phosphate particle or may penetrate through the surface of the lithium metal phosphate particle to be included in the bonding structure represented by Chemical Formula 1 or Chemical Formula 1-1.

In one embodiment, the lithium metal phosphate particles may include $LiFePO_4$.

For example, the lithium metal phosphate particles may have improved stability and cost efficiency compared to other types of cathode active material particles.

The cathode active material includes a plurality of a composite particle including a carbon coating formed on at least a portion of a surface of the lithium metal phosphate particle. An electrical conductivity of the cathode active material may be improved by the carbon coating, and thus power properties of the lithium secondary battery may be improved.

In some embodiments, a content of the carbon coating may be in a range from 0.8 wt % to 1.4 wt % based on a total weight of the composite particle. Within the above range, reduction of capacity properties may be improved while enhancing the electrical conductivity of the composite particle.

A standard deviation of thickness values of the carbon coating measured by an X-ray photoelectron spectroscopy (XPS) for five different composite particles among a plurality of composite particles is 15 nm or less, or 9 nm or less in some embodiments. Within this range, the carbon coating may be uniformly formed on the surfaces of different composite particles. Accordingly, the electrical conductivity of the cathode active material may be entirely improved, and the power properties and low-temperature performance may be improved.

For example, the cathode active material according to the above-described embodiments may be uniformly coated in a powder form on a substrate to form a sample, and thickness values of the carbon coating may be measured by the at five different points on the sample. The standard deviation of the five measured carbon coating thickness values can be calculated.

For example, the surface of the composite particle may be etched using an argon ion gun of the XPS to measure a carbon concentration and a metal element concentration according to an etching depth. The metal element may be a main metal element other than lithium contained in the lithium metal phosphate.

For example, each of the measured carbon concentration and metal element concentration may be normalized. The normalization may refer to an analysis method of converting each of the carbon concentration and the metal element concentration to a scale of 0 to 1.

For example, the thickness value of the carbon coating may be an etching depth at a point where the normalized carbon concentration and the normalized metal element concentration are equal.

According to one embodiment, the metal element may be an iron (Fe) element.

For example, surfaces of five different composite particles may be etched with the argon ion gun of the XPS, and a graph of the carbon concentration according to etching depth and the metal element concentration according to etching depth may be obtained. In this case, the carbon concentration and the metal element concentration may be expressed by the normalization. The thickness value of the carbon coating may be the etching depth at an intersection of a carbon concentration line and a metal element concentration line in the above graph.

Using the above-described measurement method, reliability and reproducibility of the measured thickness of the carbon coating may be improved.

In some embodiments, an average of the thickness values of the carbon coating measured through the XPS for 5 different composite particles may be in a range from 5 nm to 15 nm, or from 6.5 nm to 13 nm in some embodiments. Within the above range, the capacity properties may be further improved while enhancing the electrical conductivity of the cathode active material.

In some embodiments, the cathode active material subject to the above-described measurement method may be a cathode active material recovered from a lithium secondary battery or a cathode.

For example, a cathode may be obtained by disassembling the lithium secondary battery. The cathode may be put into an organic solvent (e.g., N-methyl-2-pyrrolidone (NMP)) and maintained for about 5 minutes to dissolve a binder. Thereafter, the cathode current collector may be removed, and then the organic solvent may be removed by drying.

The cathode active material and the conductive material remaining after the drying may be put into a container with distilled water, stirred for about 1 hour, and left for about 10 minutes to separate the conductive material and the cathode active material.

The conductive material separated from an upper layer of distilled water may be removed, and the cathode active material sedimented to a bottom of the container may be obtained.

The obtained cathode active material may be dried and used as the cathode active material subject to the above-described measurement method.

In some embodiments, the cathode active material subject to the above-described measurement method may be a cathode active material manufactured by the following method.

Hereinafter, a method for preparing the cathode active material including the above-described composite particles is provided.

A lithium source, a metal phosphate, a carbon source and a dispersing agent may be dispersed and mixed in distilled water to form a mixed solution. In the mixing, particles may be pulverized to a target size using a ball mill.

In one embodiment, a source of the above-described doping element and/or the coating element source may be further added to the mixed solution.

In some embodiments, the lithium source may include lithium carbonate and/or lithium hydroxide.

In some embodiments, the carbon source may include at least one selected from the group consisting of glucose, sucrose, lactose, maltose, a phenol-formaldehyde resin and a phenolic epoxy resin.

In some embodiments, the carbon source may be added in an amount from 5 wt % to 15 wt % based on a total weight of the lithium source, the metal phosphate, the carbon source and the dispersing agent. Within this range, capacity degradation may be prevented while sufficiently forming the carbon coating.

In some embodiments, the dispersive agent may include at least one selected from the group consisting of sodium hexametaphosphate, sodium tripolyphosphate and pyrophosphate.

In some embodiments, the dispersive agent may be added in an amount from 0.05 wt % to 0.5 wt % based on the total weight of the lithium source, the metal phosphate, the carbon source and the dispersive agent. Within the above range, the carbon coating may be uniformly formed on the surface of the lithium metal phosphate particle.

The mixed solution may be dried (e.g., spray-dried) to evaporate distilled water and form a mixture.

The dried mixture may be calcined at a temperature from about 500° C. to 900° C. for about 5 hours to 12 hours under a nitrogen atmosphere, and then subjected to classification and de-iron processes to form a plurality of composite particles including the lithium metal phosphate and the carbon coating.

The calcination may be performed at a temperature of, e.g., from about 600° C. to 750° C.

Figure 2:
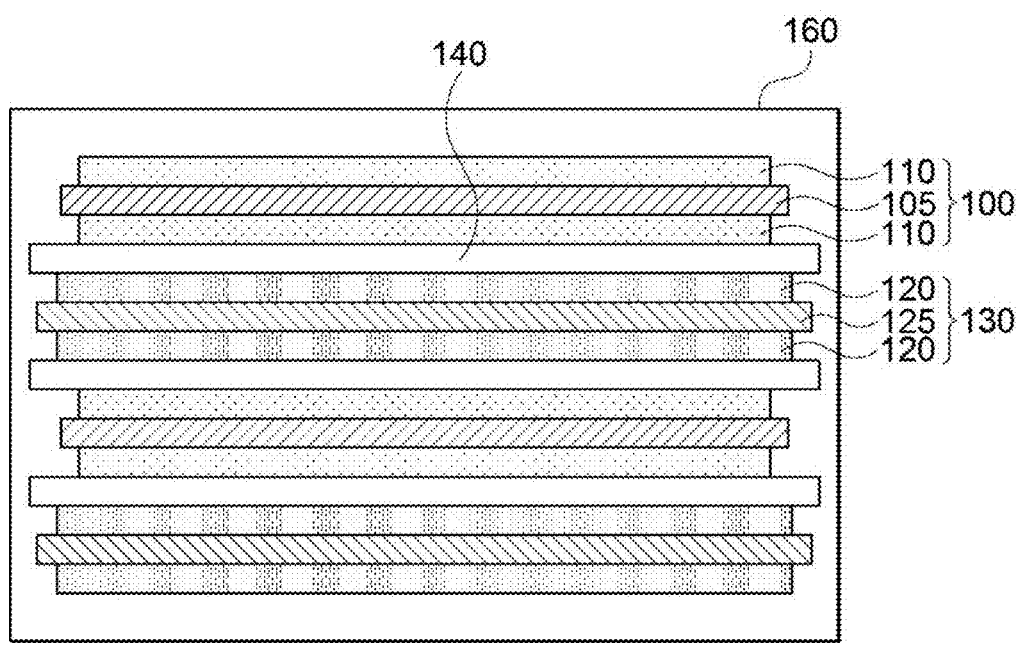

FIGS. 1 and 2 are a schematic plan view and a cross-sectional view, respectively, of a lithium secondary battery in accordance with example embodiments, respectively. For example, FIG. 2 is a cross-sectional view taken along a line I-I' of FIG. 1 in a thickness direction.

Referring to FIGS. 1 and 2, the lithium secondary battery may include a cathode 100 including the cathode active material including the above-described lithium metal phosphate particles and an anode 130 facing the cathode.

The cathode 100 may include a cathode active material layer 110 formed by coating the cathode active material on at least one surface of a cathode current collector 105.

The cathode active material may include a plurality of the lithium metal phosphate particles. For example, an amount of the lithium metal phosphate particles may be 50 wt % or more based on a total weight of the cathode active material. Preferably, the amount of the lithium metal phosphate particles may be 60 wt % or more, 70 wt % or more, 80 wt % or more, or 90 wt % or more based on the total weight of the cathode active material.

In one embodiment, the cathode active material may substantially consist of the lithium metal phosphate particles.

For example, the cathode active material may be mixed and stirred in solvent with a binder, a conductive material, and/or a dispersing agent to form a cathode slurry. The cathode slurry may be coated on the cathode current collector 105, and then dried and pressed to form the cathode 100.

The cathode current collector 105 may include stainless steel, nickel, aluminum, titanium or an alloy thereof. The cathode current collector 105 may include aluminum or stainless steel surface-treated with carbon, nickel, titanium or silver.

The binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on at least one surface of the anode current collector 125.

The anode active material may include a material capable of adsorbing and ejecting lithium ions. For example, a carbon-based material such as a crystalline carbon, an amorphous carbon, a carbon complex or a carbon fiber, a lithium alloy, silicon or tin may be used as the anode active material.

The amorphous carbon may include a hard carbon, cokes, a mesocarbon microbead (MCMB) fired at a temperature of 1500° C. or less, a mesophase pitch-based carbon fiber (MPCF), etc.

The crystalline carbon may include a graphite-based material such as natural graphite, graphitized cokes, graphitized MCMB, graphitized MPCF, etc.

The lithium alloy may further include aluminum, zinc, bismuth, cadmium, antimony, silicon, lead, tin, gallium, indium, etc.

The anode current collector 125 may include, e.g., gold, stainless steel, nickel, aluminum, titanium, copper, or an alloy thereof, and preferably may include copper or a copper alloy.

In some embodiments, a slurry may be prepared by mixing and stirring the anode active material with a binder, a conductive material and/or a dispersing agent in a solvent. The slurry may be coated on the anode current collector, and then dried and pressed to form the anode 130.

The binder and the conductive material substantially the same as or similar to those used for the cathode active material layer 110 may be used in the anode 130. In some embodiments, the binder for forming the anode 130 may include an aqueous binder such as styrene-butadiene rubber (SBR) for a compatibility with, e.g., the carbon-based active material, and carboxymethyl cellulose (CMC) may also be used as a thickener.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In example embodiments, the cathode 100 and the anode 130 may be repeatedly stacked with the separation layer 140 interposed therebetween to form an electrode assembly 150 that may have, e.g., a jelly roll shape. For example, the electrode assembly 150 may be formed by winding, stacking or folding of the separation layer 140.

The electrode assembly 150 may be accommodated together with an electrolyte in a case 160 to define the lithium secondary battery. In example embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, SCN, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the outer case 160.

The lithium secondary battery may be manufactured in, e.g., a cylindrical shape using a can, a square shape, a pouch shape or a coin shape.

Hereinafter, preferred embodiments are proposed to more concretely describe the present disclosures. However, the following examples are only given for illustrating the present disclosures and those skilled in the related art will obviously understand that various alterations and modifications are possible within the scope and spirit of the present disclosures. Such alterations and modifications are duly included in the appended claims.

Example 1

Preparation of Cathode Active Material

Lithium carbonate as a lithium source, iron phosphate, glucose as a carbon source and sodium hexametaphosphate as a dispersing agent were put in distilled water and mixed through a ball mill to pulverize particles to form a mixed solution containing $LiFePO_4$.

An amount of glucose was 5 wt % based on a total weight of lithium carbonate, iron phosphate, glucose and sodium hexametaphosphate.

An amount of sodium hexametaphosphate was 0.05 wt % based on a total weight of lithium carbonate, iron phosphate, glucose and sodium hexametaphosphate.

The LiFePO$_4$-containing mixed solution was dried using a micro-nozzle type spray dryer.

The dried powder was calcined at a temperature from about 600° C. to 750° C. for about 5 to 12 hours in a nitrogen atmosphere, and then classification and de-iron processes were performed to obtain a plurality of composite particles in which a carbon coating was formed on lithium metal phosphate particles.

Fabrication of Lithium Secondary Battery

A lithium secondary battery was fabricated using the prepared cathode active material. Specifically, a cathode slurry was prepared by mixing the cathode active material, Denka Black as a conductive material and PVDF as a binder in a mass ratio of 93:5:2, respectively. The cathode slurry was coated on an aluminum current collector, followed by drying and pressing to obtain a cathode including a cathode active material layer. A target electrode density of the cathode after the pressing was adjusted to 2.45 g/cc.

A lithium metal was used as an anode active material.

The cathode and the anode prepared as described above were notched and laminated in a circular shape having diameters of Φ14 and Φ16, respectively, and a separator (polyethylene, thickness 13 μm) notched with Φ19 was interposed between the cathode and the anode to form an electrode cell. The electrode cell was placed in a coin cell exterior material having a diameter of 20 mm and a height of 1.6 mm, and an electrolyte was injected and assembled, followed by aging for 12 hours or more so that the electrolyte could impregnate the electrode to prepare a lithium secondary battery.

A 1M LiPF$_6$ solution using a mixed solvent of EC/EMC (30/70; volume ratio) was used as the electrolyte.

Formation charging and discharging was performed on the lithium secondary battery prepared as described above (charging condition CC-CV 0.1 C 3.8V 0.05 C CUT-OFF, discharging condition CC 0.1 C 2.5V CUT-OFF).

Example 2

A cathode active material and a lithium secondary battery were prepared by the same method as that in Example 1, except that an amount of glucose was 7 wt % based on the total weight of lithium carbonate, iron phosphate, glucose and sodium hexametaphosphate, and an amount of sodium hexametaphosphate was 0.08 wt % based on the total weight of lithium carbonate, iron phosphate, glucose and sodium hexametaphosphate.

Example 3

A cathode active material and a lithium secondary battery were prepared by the same method as that in Example 1, except that an amount of glucose was 9 wt % based on the total weight of lithium carbonate, iron phosphate, glucose and sodium hexametaphosphate, and an amount of sodium hexametaphosphate was 0.09 wt % based on the total weight of lithium carbonate, iron phosphate, glucose and sodium hexametaphosphate.

Example 4

A cathode active material and a lithium secondary battery were prepared by the same method as that in Example 1, except that an amount of glucose was 10 wt % based on the total weight of lithium carbonate, iron phosphate, glucose and sodium hexametaphosphate, and an amount of sodium hexametaphosphate was 0.1 wt % based on the total weight of lithium carbonate, iron phosphate, glucose and sodium hexametaphosphate.

Example 5

A cathode active material and a lithium secondary battery were prepared by the same method as that in Example 1, except that an amount of glucose was 6 wt % based on the total weight of lithium carbonate, iron phosphate, glucose and sodium hexametaphosphate, and an amount of sodium hexametaphosphate was 0.2 wt % based on the total weight of lithium carbonate, iron phosphate, glucose and sodium hexametaphosphate.

Example 6

A cathode active material and a lithium secondary battery were prepared by the same method as that in Example 1, except that an amount of glucose was 4 wt % based on the total weight of lithium carbonate, iron phosphate, glucose and sodium hexametaphosphate, and an amount of sodium hexametaphosphate was 0.1 wt % based on the total weight of lithium carbonate, iron phosphate, glucose and sodium hexametaphosphate.

Example 7

A cathode active material and a lithium secondary battery were prepared by the same method as that in Example 1, except that an amount of glucose was 17 wt % based on the total weight of lithium carbonate, iron phosphate, glucose and sodium hexametaphosphate, and an amount of sodium hexametaphosphate was 0.05 wt % based on the total weight of lithium carbonate, iron phosphate, glucose and sodium hexametaphosphate.

Example 8

A cathode active material and a lithium secondary battery were prepared by the same method as that in Example 1, except that an amount of glucose was 3.5 wt % based on the total weight of lithium carbonate, iron phosphate, glucose and sodium hexametaphosphate, and an amount of sodium hexametaphosphate was 0.1 wt % based on the total weight of lithium carbonate, iron phosphate, glucose and sodium hexametaphosphate.

Example 9

A cathode active material and a lithium secondary battery were prepared by the same method as that in Example 1, except that an amount of glucose was 16 wt % based on the total weight of lithium carbonate, iron phosphate, glucose and sodium hexametaphosphate, and an amount of sodium hexametaphosphate was 0.1 wt % based on the total weight of lithium carbonate, iron phosphate, glucose and sodium hexametaphosphate.

Example 10

A cathode active material and a lithium secondary battery were prepared by the same method as that in Example 1, except that Al(OH)$_3$ was further added to lithium carbonate, iron phosphate, glucose and sodium hexametaphosphate.

COMPARATIVE EXAMPLE 1

A cathode active material and a lithium secondary battery were prepared by the same method as that in Example 3, except that an amount of sodium hexametaphosphate was 0.02 wt % based on the total weight of lithium carbonate, iron phosphate, glucose and sodium hexametaphosphate.

COMPARATIVE EXAMPLE 2

A cathode active material and a lithium secondary battery were prepared by the same method as that in Example 2, except that sodium hexametaphosphate was not added.

Comparative Example 3

A cathode active material and a lithium secondary battery were prepared by the same method as that in Example 2, except that an amount of sodium hexametaphosphate was 0.04 wt % based on the total weight of lithium carbonate, iron phosphate, glucose and sodium hexametaphosphate.

Comparative Example 4

A cathode active material and a lithium secondary battery were prepared by the same method as that in Example 1, except that glucose was not added.

Experimental Example (1) XPS Analysis—Calculation of Average and Standard Deviation of Carbon Coating Thickness Values For the composite particles prepared according to the above-described Examples and Comparative Examples, thickness values of carbon coatings of 5 different composite particles were measures using an XPS.

The cathode active material was applied on the substrate, and then the XPS analysis was performed on five different points under the following conditions.

[XPS Analysis Conditions]
i) X-ray type: Al k alpha, 1486.68 eV, 900 μm Beam size
ii) Analyzer: CAE (constant analyzer energy) Mode
iii) Number of scans: 50
iv) Pass energy: 20 eV
v) Dwell time: 100 ms
vi) Ion gun: Ar ion
vii) Ion energy: 4000 eV
viii) Etch cycle: 300 s
ix) Total levels: 20

Specifically, surfaces of the composite particles prepared according to Examples and Comparative Examples were etched using the argon ion gun, and the XPS analysis was performed to obtain graphs of a carbon concentration according to an etching depth in each composite particle and an iron concentration according to the etching depth. In the graphs, minimum points and maximum points of the carbon concentration graph and the iron concentration were scale-converted as 0 and 1, respectively (i.e., normalization).

The etching depth at an intersection of a carbon concentration line and an iron concentration line in the above graph was evaluated as the thickness value of the carbon coating.

Figure 3:
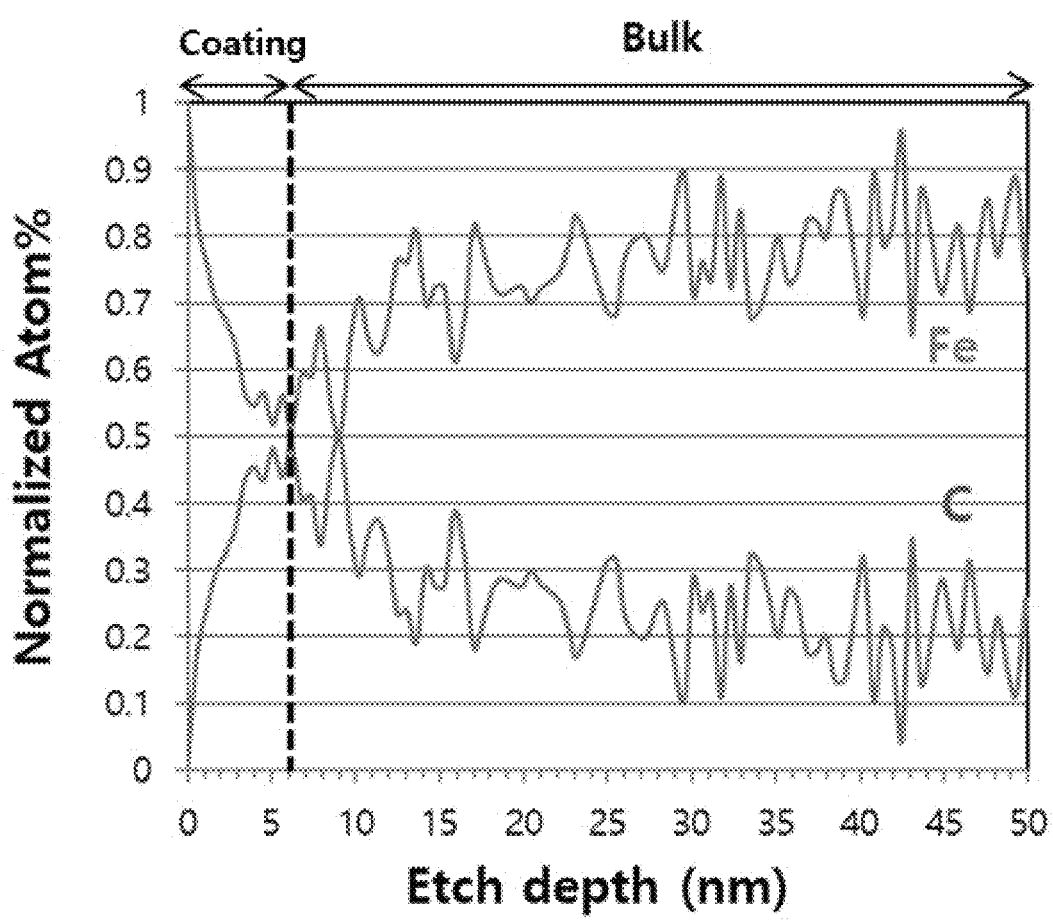
FIG. 3 is an example graph showing a carbon concentration according to an etching depth and an iron concentration according to the etching depth of one composite particle among composite particles of Example 1.

FIG. 3 is an example graph showing a carbon concentration according to an etching depth and an iron concentration according to the etching depth of one composite particle among composite particles of Example 1.

The average and standard deviation of the obtained carbon coating thickness values of the five composite particles were calculated.

(2) Measurement of Carbon Content

A carbon content in each cathode active material prepared according to the above-described Examples and Comparative Examples was measured using a C/S analyzer (carbon/sulfur analyzer, CS844, LECO Co.).

Specifically, the carbon content in the sample was quantitatively analyzed by detecting $CO_2$ generated when 1 g of the cathode active material sample was combusted.

(3) Measurement of Electrical Conductivity

An electrical conductivity of each cathode active material prepared according to the above-described Examples and Comparative Examples was measured using a powder resistance measuring instrument (MCP-PD51, Nittoseiko Analytech Co.).

Specifically, 2 g of the cathode active material sample was pressed to have a density of about 2.0 g/cc, and then a resistance and an electrical conductivity of the sample were measured.

Analysis conditions are as follows.
i) Start lane: 1 Ohm
ii) Voltage limiter: 10V
iii) Probe: 4-pin probe (electrode distance 3.0 mm/electrode radius 0.7 mm/sample radius: 10.0 mm)

(4) Measurement of Ratio of 2 C Discharge Capacity to 0.1 C Discharge Capacity

Charge (CC-CV 0.5 C 3.65V 0.05 C CUT-OFF) and discharge (CC 0.1 C 2.5V CUT-OFF) for each lithium secondary battery manufactured according to the above-described Examples and Comparative Examples was performed at room temperature (25° C.), and a discharge capacity was measured. The measured discharge capacity was evaluated as a 0.1 C discharge capacity.

Charge (CC-CV 0.5 C 3.65V 0.05 C CUT-OFF) and discharging (CC 2 C 2.5V CUT-OFF) for each lithium secondary battery manufactured according to the above-described Examples and Comparative Examples were performed at room temperature (25° C.), and a discharge capacity was measured. The measured discharge capacity was evaluated as a 2 C discharge capacity.

A ratio of the 2 C discharge capacity to the 0.1 C discharge capacity was calculated as a percentage by dividing the 2 C discharge capacity by the 0.1 C discharge capacity.

(5) Evaluation on Low Temperature Power Property

Charge (CC-CV 0.5 C 3.65V 0.05 C CUT-OFF) and discharge (CC 0.1 C 2.5V CUT-OFF) for each lithium secondary battery manufactured according to the above-described Examples and Comparative Examples were performed at room temperature (25° C.), and a discharge capacity was measured. The measured discharge capacity was evaluated as a room temperature discharge capacity.

Charge (CC-CV 0.5 C 3.65V 0.05 C CUT-OFF) and discharge (CC 0.1 C 2.5V CUT-OFF) for each lithium secondary battery manufactured according to the above-described Examples and Comparative Examples were performed at low temperature (−7° C.), and a discharge capacity was measured. The measured discharge capacity was evaluated as a low-temperature discharge capacity.

The low-temperature discharge capacity was divided by the room-temperature discharge capacity to calculate a low-temperature power property as a percentage.

The evaluation results are shown in Tables 1 and 2 below.

TABLE 1

| No. | average of carbon coating thickness (nm) | standard deviation of carbon coating (nm) | carbon content (wt %) |
| --- | --- | --- | --- |
| Example 1 | 12.8 | 8.6 | 1.19 |
| Example 2 | 10.6 | 6.5 | 1.23 |
| Example 3 | 4.6 | 2.6 | 1.36 |
| Example 4 | 9.0 | 3.3 | 1.38 |
| Example 5 | 6.6 | 1.2 | 1.20 |
| Example 6 | 4.2 | 7.9 | 1.10 |
| Example 7 | 15.1 | 14.7 | 1.40 |
| Example 8 | 5.0 | 8.0 | 0.78 |
| Example 9 | 14.8 | 10.1 | 1.41 |
| Example 10 | 12.6 | 9.3 | 1.20 |
| Comparative Example 1 | 17.2 | 18.7 | 1.37 |
| Comparative Example 2 | 12.2 | 22.9 | 1.28 |
| Comparative Example 3 | 12.6 | 17.1 | 1.30 |
| Comparative Example 4 | 0 | — | 0 |

TABLE 2

| No. | electrical conductivity (S/cm) | ratio of 2 C discharge capacity to 0.1 C discharge capacity (%) | low temperature (−7° C.) power property (%) |
| --- | --- | --- | --- |
| Example 1 | 0.05 | 85.3 | 54.4 |
| Example 2 | 0.06 | 87.5 | 56.1 |
| Example 3 | 0.08 | 88.6 | 58.7 |
| Example 4 | 0.08 | 88.2 | 58.3 |
| Example 5 | 0.09 | 90.1 | 61.3 |
| Example 6 | 0.10 | 80.5 | 51.2 |
| Example 7 | 0.09 | 89.2 | 52.0 |
| Example 8 | 0.02 | 82.4 | 53.6 |
| Example 9 | 0.09 | 89.0 | 52.2 |
| Example 10 | 0.06 | 86.1 | 54.5 |
| Comparative Example 1 | 0.003 | 70.4 | 48.5 |
| Comparative Example 2 | 0.009 | 73.9 | 45.6 |
| Comparative Example 3 | 0.006 | 77.7 | 43.4 |
| Comparative Example 4 | 0.001 | 65.4 | 40.2 |

Referring to Tables 1 and 2, in Examples where the standard deviation of carbon coating thickness values was 15 nm or less, the electrical conductivity, the 2 C discharge capacity ratio to 0.1 C discharge capacity and the low-temperature power property were entirely improved compared to those from Comparative Examples.

In Example 6 where the average of the carbon coating thickness values was less than 5 nm, the electrical conductivity and the power property were relatively lowered compared to those from other Examples.

In Example 7 where the average of the carbon coating thickness values exceeded 15 nm, the low-temperature power property was relatively lowered compared to those from other Examples.

In Example 8 where the carbon content in the composite particles was less than 0.8 wt %, the electrical conductivity and the power property were relatively lowered compared to those from other Examples.

In Example 9 where the carbon content in the composite particles exceeded 1.4 wt %, the low-temperature power property was relatively lowered compared to those from other Examples.

What is claimed is:

1. A cathode active material for a lithium secondary battery comprising a plurality of a composite particle, each of which comprises:
   a lithium metal phosphate particle having an olivine structure and is represented by Chemical Formula 1:

$Li_aM_xP_yO_{4+z}$ [Chemical Formula 1]

wherein, in Chemical Formula 1, $0.9 \leq a \leq 1.2$, $0.99 \leq x \leq 1.01$, $0.9 \leq y \leq 1.2$, $-0.1 \leq z \leq 0.1$, and M is a metal including at least one selected from the group consisting of Fe, Co, Ni and Mn; and
   a carbon coating formed on at least a portion of a surface of the lithium metal phosphate particle;
   wherein a standard deviation of thickness values of the carbon coating measured by an X-ray photoelectron spectroscopy (XPS) for five different composite particles of the plurality of the composite particle is 15 nm or less,
   an average of the thickness values of the carbon coating is in a range from 5 nm to 15 nm,
   a content of the carbon coating is in a range from 0.8 wt % to 1.4 wt % based on a total weight of the composite particle,
   the cathode active material is made from a mixture of a lithium source, a metal phosphate, a carbon source comprising glucose, and a dispersing agent selected from group consisting of sodium hexametaphosphate, sodium tripolyphosphate, pyrophosphate, and combinations thereof, and
   the glucose is in an amount of 3.5 to 17% based on the total weight of the lithium source, the metal phosphate, the glucose, and the dispersing agent, and
   the dispersant agent is in an amount of 0.05 to 0.2% based on the total weight of the lithium source, the metal phosphate, the glucose, and the dispersing agent.

2. The cathode active material for a lithium secondary battery according to claim 1, wherein M includes Fe.

3. The cathode active material for a lithium secondary battery according to claim 1, wherein an average of the thickness values of the carbon coating is in a range from 6.5 nm to 13 nm.

4. The cathode active material for a lithium secondary battery according to claim 1, wherein the standard deviation of the thickness values of the carbon coating is 9 nm or less.

5. The cathode active material for a lithium secondary battery according to claim 1, wherein the thickness value of the carbon coating is an etching depth at a point where a carbon concentration and a concentration of a metal element except for lithium contained in the lithium metal phosphate particle which are measured by etching a surface of the composite particle using an argon ion gun of the XPS are equal.

6. The cathode active material for a lithium secondary battery according to claim 1, wherein the lithium metal phosphate particle contains a doping element including at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr.

7. A lithium secondary battery, comprising:
   a cathode comprising the cathode active material for a lithium secondary battery of claim 1; and
   an anode facing the cathode.

8. The lithium secondary battery of claim 7, further comprising separator interposed between the cathode and the anode.

* * * * *